United States Patent [19]

Ferrando et al.

[11] Patent Number: 5,120,575

[45] Date of Patent: Jun. 9, 1992

[54] SILVER LINED CERAMIC VESSEL AND METHOD OF PREPARATION

[75] Inventors: William A. Ferrando, Arlington; Amarnath P. Divecha, Falls Church, both of Va.; James Kerr, Bethesda, Md.

[73] Assignee: The United States of America as represented by the Secretary of the Navy, Washington, D.C.

[21] Appl. No.: 700,375

[22] Filed: May 10, 1991

[51] Int. Cl.$^5$ .............................................. B05D 3/02
[52] U.S. Cl. ..................................... 427/229; 427/230; 427/235; 427/380; 427/431; 427/443.2
[58] Field of Search .............. 427/235, 230, 229, 380, 427/431, 443.2

[56] References Cited

U.S. PATENT DOCUMENTS

| | | | |
|---|---|---|---|
| 2,924,535 | 2/1960 | Schaefer | 427/229 |
| 4,130,671 | 12/1978 | Nagesh et al. | 427/229 |
| 4,650,108 | 3/1987 | Gallagher | 427/229 |
| 4,822,694 | 4/1989 | Randin et al. | 427/230 |
| 4,830,881 | 5/1989 | Becker et al. | 427/230 |
| 4,906,493 | 3/1990 | Laine | 427/229 |

Primary Examiner—Janyce Bell
Attorney, Agent, or Firm—Kenneth E. Walden; Roger D. Johnson

[57] ABSTRACT

A reaction vessel comprising (1) a porous ceramic structure having interconnecting, open pores and (2) silver metal coating the inner ceramic surfaces of the reaction vessel and filling the interconnecting, open pores to form a strong bond between the porous ceramic structure and the silver coating.

The reaction vessel can be produced by
(1) coating the inner surface and infiltrating the continuous, open pores of an unglazed porous ceramic structure (or vessel) with molten $AgNO_3$;
(2) decomposing the $AgNO_3$ to silver metal; and then
(3) repeating steps (1) and (2) until all the pores are filled with silver metal.

3 Claims, No Drawings

SILVER LINED CERAMIC VESSEL AND METHOD OF PREPARATION

BACKGROUND OF THE INVENTION

This invention relates to reaction vessels and more particularly high temperature reaction vessels having inert metal surfaces.

Many of the component elements, oxides and nitrates used in synthesizing high temperature superconductor (HTS) compounds (and perhaps other classes of compounds) tend to react with most containment vessels during the high temperature processing required to form or sinter the materials. The noble metals are the only materials which remain essentially non-reactive under the required processing conditions. The noble metals (gold and silver) have been shown to protect the HTS compounds during thermal treatment and impart beneficial properties as additives. In achieving the the purity of final HTS product necessary for high transport current, introduction of second phases during heat treatment must be minimized. Difficulty arises, however, when pure silver itself is used as a reaction vessel, as much of the processing must be carried out within 100° C. or so of the silver melting point (960° C.). In this circumstance, which is quite common in the processing of high temperature superconductor (HTS) materials, the crucible softens and sags. This may cause the sample to embed itself or to cause other removal problems. Needed in this application is a cause practical means of producing a reinforced silver crucible (or other vessel shape) which presents a pure silver surface to the sample during thermal processing while maintaining structural stability near the silver melting temperature.

SUMMARY OF THE INVENTION

Accordingly an object of this invention is to provide an improved noble metal reaction vessel.

Another object of this invention is to provide a new reaction vessel having a silver surface in the reaction chamber which is resistant to slumping at temperatures near the melting point of silver.

Another object of this invention is to provide a new method of making silver lined ceramic reaction vessels.

These and other objects of this invention are accomplished by providing:

A reaction vessel comprising
A. a porous ceramic structure having interconnecting, open pores; and
B. silver metal coating the inner ceramic surfaces of the reaction vessel and filling the interconnecting, open pores to form a strong bond between the porous ceramic structure and the silver coating.

The reaction vessel can be produced by
A. putting molten $AgNO_3$ into an unglazed, porous ceramic vessel having continuous, open pores;
B. coating the inner surface of the ceramic vessel with the molten $AgNO_3$ at a temperature above the melting point of $AgNO_3$ but below the decomposition temperature of $AgNO_3$ until the molten $AgNO_3$ penetrates the continuous, open pours of the ceramic vessel;
C. removing any excess molten $AgNO_3$; and
D. heating the molten $AgNO_3$-coated ceramic vessel at a temperature of from the decomposition temperative of $AgNO_3$ up to about 850° C. until the $AgNO_3$ decomposes to form silver metal; and
E. repeating steps C and D until the pores of the ceramic vessel are filled with silver metal.

DETAILED DESCRIPTION OF THE PREFERRED EMBODIMENT

The present invention provides a simple method of producing a new strengthened silver faced reaction vessel for difficult reaction processes requiring a noble metal surface. The reaction vessel comprises a ceramic body which provides rigidity and a silver metal coating which provides the noble metal reaction surface inside the vessel. Conventional silver metal vessels begin to slump at about 850° C. The ceramic body of the present vessel prevents slumping up to temperatures near the melting point of silver (960° C.).

The initial ceramic structure is an unglazed, porous ceramic vessel having interconnecting, open pores. Water will seep or flow out of the ceramic wall of such a vessel. The open porosity of the ceramic vessel is preferably about 5 to about 40 volume percent, and more preferably from 10 to 25 volume percent.

The vessel may be composed of ceramic materials conventionally used in high temperatures reaction crusibles. Such materials are inert and nonreactive with molten $AgNO_3$ and hot silver. Examples of such materials include alumina, thoria, zirconia, magnesia, zeolite, etc. Vessels made of alumina and of thoria were used in the examples. b Reaction vessels of many types may be produced in this invention. Examples include crucibles, boats, reaction tubes, etc. A reaction crucible and reaction boat were produced and used in the examples. Reaction vessels also include enclosed reaction chambers.

The first step of the process coats the inner or reaction surfaces of the vessel and infiltrates the interconnecting, open pores with molten $AgNO_3$. One method of accomplishing this is by immersing the porous ceramic vessel in a molten bath of $AgNO_3$ until the molten $AgNO_3$ has infiltrated and filled the interconnecting open pores of the ceramic vessel. In another method the $AgNO_3$ may be heated in the vessel until it becomes molten and coats the inside surface and fills the interconnecting open pores of the ceramic vessel. When this happens molten $AgNO_3$ can be observed seeping out of the outer walls of the ceramic vessel. What ever method is used, the temperature of the $AgNO_3$ and the porous ceramic vessel is above the melting point of $AgNO_3$ but below the decomposition temperature of $AgNO_3$ during the actual coating and infiltration part of the process.

After the coating of the inner surface and infiltration of the pores of the ceramic reaction vessel is complete, the vessel is separated from the excess $AgNO_3$.

Next, the molten $AgNO_3$ coated and infiltrated porous ceramic vessel is heated at a temperature above the decomposition temperature of $AgNO_3$ but below the melting point of silver (960° C.) to decompose the molten $AgNO_3$ to silver metal. Preferably the decomposition temperature is from the decomposition temperature of $AgNO_3$ up to about 850° C., more preferably from about 450° C. to about 550° C., and still more preferably from 450° C. to 500° C.

The coating and infiltrations step and the decomposition step are repeated until the interconnecting, open pores are filled with silver metal and the inner (reaction) surface of the ceramic vessel is uniformly coated with silver metal.

Silver metal is very malleable and the silver metal coating on the inside surface can be polished to a high degree of smoothness if desired.

The general nature of the invention having been set forth, the following examples are presented as specific illustrations thereof. It will be understood that the invention is not limited to these specific examples, but is susceptible to various modifications that will be recognized by one of ordinary skill in the art.

EXAMPLE 1

A 25 ml unglazed thoria crucible, containing several grams of $AgNO_3$ was placed on a hot plate and heated to about 250° C. The $AgNO_3$ was observed to melt and spontaneously infiltrate into the open porosity of the crucible and to penetrate to its outer surface within 2 minutes. The crucible then was transferred to a furnace and heated to about 460° C. to decompose the $AgNO_3$. The initial porosity of the crucible was measured roughly on a porosimeter at about 25%. Its initial (unimpregnated) weight was 149.4 grams and final (silver bearing) weight was 160.4 grams. In order to verify its stability, the silverized crucible was fired at 900° C. in air for 1½ hours and reweighed. Its weight remained exactly 160.4 grams. The crucible was fired another 2 hours at 940° C. again with no weight loss.

EXAMPLE 2

About 5 grams of BiSCCO (bismuth-strontium calcium-copper oxide) superconductor powder was placed into the silverized crucible (produced in Example 1) and fired at 900° C. for about 12 hours. The sample was removed after cooling in the form of a sintered cake. While some of the material did infiltrate into the crucible pores which were filled only partially with Ag, the bulk of the sample showed no evidence of reaction with the crucible.

EXAMPLE 3

A porous unglazed alumina boat was loaded with several grams of $AgNO_3$ and heated in the same manner as in Example 1. The liquid $AgNO_3$ was observed to soak readily into the ceramic. After decomposition of the $AgNO_3$, the process was repeated until no additional liquid $AgNO_3$ would penetrate into the ceramic. This assured that, after the final decomposition, the pores were essentially filled with Ag. The initial (unimpregnated) weight of the boat was 20.8 grams. Its final (impregnated) weight was 34.8 grams.

EXAMPLE 4

Attempt was made to melt a powder mixture of 2 parts BaO and 3 parts CuO to form liquid barium cuprate in the silverized boat produced in Example 3. Several grams of this powder mixture were placed into this boat which then was fired in air for 12 hours at 900° C. The sample was easily removed with only slight residue remaining behind and no indication of reaction or infiltration into the crucible.

Obviously, numerous modifications and variations of the present invention are possible in light of the above teachings. It is therefore to be understood that within the scope of the appended claims the invention may be practiced otherwise than as specifically described.

What is claimed and desired to be secured by Letters Patent of the United State is:

1. A process for forming a silver lined ceramic reaction vessel comprising
   A. putting molten $AgNO_3$ into an unglassed, porous ceramic vessel having continuous, open pores;
   B. coating the inner surface of the ceramic vessel with molten $AgNO_3$ at a temperature above the melting point of $AgNO_3$ and below the decomposition temperature of $AgNO_3$ until the molten $AgNO_3$ penetrates the continuous, open pores of the ceramic vessel and begins to seep out of the outside surface of the ceramic vessel;
   C. removing any excess molten $AgNO_3$;
   D. heating the molten $AgNO_3$-coated ceramic vessel at a temperature of from the decomposition temperature of $AgNO_3$ up to about 850° C. until the $AgNO_3$ decomposes to form silver metal; and
   E. repeating steps B, C, and D until the pores in the ceramic material are filled with silver metal.

2. The process of claim 1 wherein in step D the decomposition temperature is from about 450° C. to about 550° C.

3. The process of claim wherein in step D the decomposition temperature is from 450° C. to about 500° C.

* * * * *